Patented Oct. 24, 1950

2,527,314

UNITED STATES PATENT OFFICE 2,527,314

PRODUCTION OF GUANAMINES

Johnstone S. Mackay, Old Greenwich, Conn., assignor to American Cyanamid Company, New York, N. Y., a corporation of Maine No Drawing. Application July 9, 1946, Serial No. 682,283

6 Claims. (Cl. 260—249.9)

The present invention relates to the production of guanamines of the formula

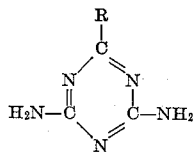

where R may be hydrogen or any aliphatic or aromatic hydrocarbon radical.

Heretofore, guanamines have been prepared by reacting biguanides with esters, acid chlorides, or acid anhydrides, by reacting dicyandiamide with amidine salts or nitriles and by the pyrolysis of guanidine salts of organic acids. In view of the expense of the biguanides, amidine salts, nitriles and guanidine salts it is readily apparent that the starting materials employed in all these methods for the preparation of guanamines are sufficiently expensive to render the production of the desired guanamines likewise expensive.

An object of the present invention is the provision of inexpensive guanamines.

Another object of the present invention is the provision of a new method for the preparation of guanamines.

Other objects will be apparent from the discussion hereinafter provided.

It has now been found that guanamines may be produced by the treatment of nitriles with urea, preferably in the presence of ammonia. In addition to the use of nitriles, organic acids and amides may be employed since they readily form the corresponding nitriles under the conditions of the reaction, particularly when ammonia is present.

The equation for the conversion of the nitriles to the guanamines may be written, empirically, as follows:

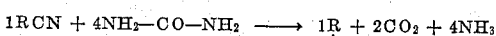
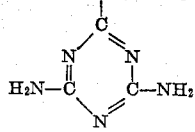

However, the formation of the guanamines from the nitriles and urea probably takes place through a series of intermediate reactions rather than by direct conversion as shown above. When urea is heated above its melting point (132° C.) in an open system several products result. These are ammonium cyanate, biuret, cyanuric acid and ammelide. The source of all these compounds is postulated to be ammonia and HCNO. HCNO reacts with urea to give biuret, with itself to give cyanuric acid and with biuret to give ammelide. Under ammonia pressure, and at temperatures of 250° C. and above, urea forms mainly cyanuric acid and then apparently passes through the stages of ammoniation represented by ammelide and ammeline and finally is converted to melamine. In the case of a nitrile being present, it is supposed that after the biuret is formed from urea and HCNO, the nitrile reacts and cyclizes the biuret to guanamide which is then eventually converted to the guanamine in a manner analogous to the ultimate formation of melamine as above described.

As indicated by the above equation, ammonia is produced in the course of the reaction. Since the use of added ammonia has proved advantageous from the standpoint of the efficiency of the urea utilization, apparently such ammonia results primarily from the decomposition of the urea. In cases where no added ammonia is provided it has been found that somewhat larger quantities of urea are required. The necessity of providing additional quantities of urea is particularly apparent when the nitrile reactant is replaced by the equivalent acid or amide.

The temperature employed in the practice of the present invention should be at least 250° C. and should not exceed about 500° C., the preferred temperature range being substantially 270°–390° C. The upper limit of 500° C. is set by the observation that above this temperature the side-reaction resulting in the formation of melamine occurs so that while the reaction may be carried out above 500° C. the product will be found to be contaminated with melamine and a corresponding decrease in the efficiency of the reaction will be sustained. Such melamine formation is to be avoided particularly when the process is carried out continuously, recycling the reaction mixture after removal of the guanamine. Obviously, if the formation of melamine is substantial this would necessitate its eventual removal and would impose additional operations.

While added ammonia need not be employed for the reaction of the present invention to occur, as indicated hereinabove, it is preferable that such added ammonia be provided. Further, it has been found that in order to obtain appreciable advantage from the use of such added ammonia it should be employed in such quantity as to provide a partial pressure of at least 200 lbs./sq. in. Further, in order to obtain maximum yields ammonia pressures of substantially 2000 lbs./sq.

in. and above should be employed. Although pressures considerably above 2000 lbs./sq. in. may be employed if desired, such additionally high ammonia pressures serve to provide little additional advantage and only necessitate the use of stronger reaction vessels.

Generally, the lowest possible ratio of nitrile to urea will be employed since the nitrile is the expensive reactant and this obviously calls for the use of the urea in excess. Also, as indicated above, larger excesses of urea are required when reaction is carried out with the equivalent acids and amides. However, fluidity of the reaction mixture should be provided in order for the reaction to go as efficiently as possible, so that the amount of nitrile which must be used in many cases is larger than would be desired since the liquid nitriles are relied upon to provide such fluidity. In the case of more volatile nitriles, acids, and amides larger amounts of such reactants must be employed in reacting with the urea since a larger proportion of these materials tends to be in the vapor phase. On the other hand, this can be minimized by employing either a smaller autoclave or by charging a given autoclave to substantially its full capacity in order to minimize the head-space volume. As an alternative to employing excess nitrile in order to provide a liquid medium for the reaction, a suitably high boiling solvent can likewise be employed such as a high boiling amine, although any high boiling solvent or diluent which would remain substantially unaffected under the conditions of the reaction would be suitable.

Isolation of the guanamines may be effected by any suitable method but generally it will be found advantageous to effect the separation on the basis of their solubility in sulfuric acid, or, perhaps more correctly, the solubility of their sulfates, and the insolubiilty of the nitriles, amides and acids and by-product melamine in such acid solutions. Hydrochloric acid may likewise be used as may also dilute nitric acid, although the latter is less desirable because of its difficult handling characteristics. Other acids capable of forming soluble salts with the guanamines may also be used. After dissolving out the guanamine and separating the insoluble material, as, by filtration, the guanamine may be recovered by precipitation with alkali hydroxide or other suitable base which will serve to neutralize the acid solution in which the guanamine is dissolved. Another convenient method of separating the guanamines relies upon their general solubility in dioxane, the nitriles, amides, acids, and the melamine being insoluble. The procedure is the same as that employed when the guanamines are separated with acid except that the guanamines are recovered from solution by removal of the solvent, as, by distillation or evaporation, and the guanamines are allowed to crystallize or otherwise precipitate. In many cases the separation of the guanamine from the reaction mixture is facilitated by first separating or otherwise removing the unreacted nitrile. The removal of such nitrile may be effected generally by evaporation or it may be effected by leaching the reaction mixture with ethyl ether. This latter method has the obvious advantage that it permits the recovery of the expensive nitrile and would increase the efficiency of the nitrile utilization.

While there is some indication of increased yields being provided by heating for more than 2 hours, say, for 4 or 6 hours, only a small increase in yield is obtained by so doing and the practice of using such longer periods of reaction is not practical from the standpoint of production. Undoubtedly, a period of reaction of less than 2 hours may be employed but if such period of reaction is unduly shortened the yields provided will be correspondingly lowered.

Guanamines which may be prepared in accordance with the preparation of the present invention include those wherein the R of the above-given formula is $-C_2H_5$, $-C_3H_7$, $-C_4H_9$, $-C_6H_{13}$, $-C_9H_{19}$, $-C_{10}H_{21}$, $-C_2H_4$, $-C_4H_7$, $-C_5H_7$, cyclohexyl, tolyl, xylyl, naphthyl, and various other aromatic radicals in which one or more hydrogens of the ring are replaced by such radicals as ethyl, propyl, butyl, vinyl, allyl, amyl, hexyl, heptyl, octyl, nonyl, decyl, undecyl, dodecyl, cyclohexyl, phenyl, naphthyl, and the like.

The following examples are provided to show the detailed procedures involved in the practice of the present invention. However, such specific embodiments are not to be considered as limiting the scope of the present invention but rather the invention is to be construed solely in the light of the appended claims. In all of the following examples the amounts given are in gram moles.

EXAMPLE 1

*Acetoguanamine*

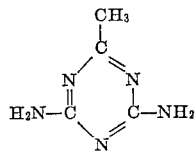

1.0 mol of urea, 0.5 mol of acetonitrile and about 1.0 mol of anhydrous ammonia are placed in a 300 cc. autoclave and heated at 350° C. for 2 hours. The autoclave is quenched in water and when cool vented to release the pressure. The product is discharged from the bomb and the material is dried at 105° C. for overnight. The weight loss resulting from such drying is mainly ammonium carbamate and unreacted acetonitrile. The dried product is then put into 500 cc. of water to which are added 60 cc. of 37% HCl. This mixture is heated to boiling and filtered immediately and to the filtrate is added sodium hydroxide sufficient to render the solution strongly basic whereupon the acetoguanamine precipitates. The acetoguanamine prepared in this manner is somewhat impure melting slightly below the melting point of pure acetoguanamine which is 271°–273° C. The acetoguanamine may be purified by further solution in acid and reprecipitating with alkali hydroxide as before and the product may be triturated with ice water to effect a still further degree of purification.

EXAMPLE 2

*Benzoguanamine*

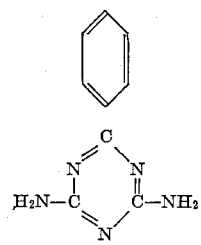

(A) 1.0 mol of urea, 0.5 mol of benzonitrile and about 1.0 mol of anhydrous ammonia are placed in a 300 cc. autoclave and heated at 275° C. for 2 hours. The autoclave is quenched in water and when cool is vented to release the pressure. The product is discharged from the bomb and is an oily dark green mass. It is dried overnight at 105° C. to remove ammonium carbamate and unreacted benzonitrile. The dried product is then put into 500 cc. of water to which are added 60 cc. of 37% HCl. This mixture is heated to boiling and filtered. Sodium hydroxide is added to render the filtrate strongly basic whereupon the benzoguanamine precipitates. The benzoguanamine is filtered and dried. In this manner benzoguanamine melting at 210°–220° C. may be provided in yields of 45% of theoretical.

(B) 1.0 mol of urea, 0.5 mol of benzonitrile and 1.0 mol of anhydrous ammonia are heated at 300° C. for 2 hours in a 300 cc. autoclave. The bomb is quenched in water and when cool is vented to release the pressure. The product is discharged and thereafter leached with 400 cc. of boiling dioxane and filtered while hot. The small amount of material which is not soluble in dioxane is mainly melamine. The dioxane solution is evaporated to 100 cc. and thereafter poured into 2 l. of dilute ammonium hydroxide. A dense, chalky white precipitate of benzoguanamine settles out and is fitered off. In this manner benzoguanamine melting at 216°–224° C. and amounting to 67% of theoretical may be provided.

(C) 4.0 mols of urea, 1.0 mol of benzamide and 1.0 mol of anhydrous ammonia are placed in a 300 cc. autoclave and heated for 2 hours at 350° C. The autoclave is quenched in water and when cool is vented to release the pressure. The product is discharged from the bomb and leached with ethyl ether to remove unreacted nitrile. The guanamine is thereafter recovered from the residue by either of the methods employed under A or B of this example. The yields of benzoguanamine provided in this manner are slightly lower than those provided by reacting the nitrile directly being of the order of 32% of theoretical. That the reaction proceeds by the amide being first converted to the nitrile is clearly indicated by the fact that an appreciable quantity of nitrile is recovered upon evaporation of the aforementioned ethyl ether extract.

(D) 4.0 mols of urea, 1.0 mol of benzoic acid and 1.0 mol of anhydrous ammonia are reacted in a 300 cc. autoclave by heating to 350° C. for 2 hours. The autoclave is quenched in water and when cool is vented to release the pressure. The product is discharged from the bomb and worked up according to the scheme of separation detailed under C of this example to provide a 55% yield of benzonitrile and a 39% yield of benzoguanamine. Reacting 2.0 mols of urea with 1.0 mol of benzoic acid and 1.0 mol of anhydrous ammonia under the same conditions provides a yield of 86.5% benzonitrile and only a small yield of the desired benzoguanamine, thus showing the desirability of employing a greater amount of urea when reacting the acid.

Separating the product from the reaction mixture by employing boiling dioxane results in a purer product and is much more conveniently carried out. However, in large scale production the greater cost of the dioxane as compared with the cheap acid and alkali employed in effecting the separation used in A of this example would, in most cases, rule out the use of the organic solvent.

EXAMPLE 3

*Propionoguanamine*

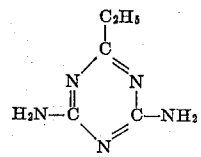

(A) 1.0 mol of propiononitrile, 0.67 mol of urea and 1.0 mol of anhydrous ammonia are placed in a 300 cc. autoclave and heated at 375° C. for 2 hours. The autoclave is thereafter quenched in cold water and upon cooling is vented to release the pressure. The product is removed and dried in an oven at 105° C. for overnight and thereafter added to 200 cc. of water containing 20.0 cc. of concentrated $H_2SO_4$ and after stirring and heating for a short time the mixture is filtered. The small amount of insoluble matter is mainly melamine. The filtrate is neutralized by the addition of 28% $NH_4OH$, the final pH being 5–6. 30 cc. of 50% gluconic acid may then be added to prevent the precipitation of iron compounds resulting from the reaction mixture attacking the bomb to a small extent. The solution is thereafter rendered strongly basic by the addition of more $NH_4OH$ and after cooling for 2 hours the propionoguanamine which has crystallized substantially completely is filtered off and dried. The propionoguanamine prepared in this manner melts at 275°–276° C. and is provided in yields of about 41% of theoretical.

(B) 1.5 mols of urea and 0.5 mol of propiononitrile are placed in a 300 cc. autoclave and heated at 350° C. for 2 hours. The autoclave is quenched in water, cooled and vented. The product is discharged from the autoclave and dried at 105° C. overnight and thereafter placed in 500 cc. of water to which are added 60 cc. of 37% HCl. This mixture is heated to boiling and filtered and sodium hydroxide added to the filtrate to render the same strongly basic and precipitate the propionoguanamine which is then filtered and dried. As under A of this example the product melts sharply at 275°–276° C. but the yields provided are slightly lower than are obtained when anhydrous ammonia is added to the autoclave.

EXAMPLE 4

*Octanoguanamine*

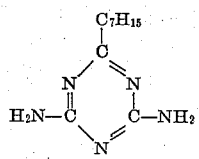

2.0 mols of urea, 0.5 mol of octanonitrile and 1.0 mol of anhydrous ammonia are heated at 300° C. for 2 hours in a 300 cc. autoclave. The bomb is quenched in water and when cool is vented to release the pressure. The product is discharged and thereafter leached with 400 cc. of boiling dioxane and filtered while hot. The small amount of material which is not soluble in dioxane is mainly melamine. The dioxane solution is evaporated to 100 cc. and thereafter poured into 2 l. of dilute ammonium hydroxide. A slightly waxy precipitate of octanoguanamine settles out and is filtered off. In this manner octanoguanamine melting at 171°–173° C. is obtained. Crystallization from methanol gives colorless plates melting at 174°–175° C.

EXAMPLE 5

Oleoguanamine

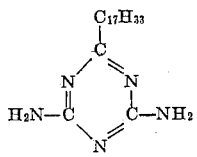

2.0 mols of urea, 0.5 mol of oleonitrile and about 1.0 mol of anhydrous ammonia are placed in a 300 cc. autoclave and heated at 275° C. for 2 hours. The autoclave is quenched in water and when cool is vented to release the pressure. The product is discharged from the bomb and is an oily dark green mass. This mass is steam distilled to remove unreacted oleonitrile. The residue from the distillation is then placed in 400 cc. of dioxane and the mixture is heated to boiling and filtered. The dioxane is removed under reduced pressure to obtain the oleoguanamine as a pasty solid which may be purified by solution in hot acetone.

EXAMPLE 6

Lauroguanamine

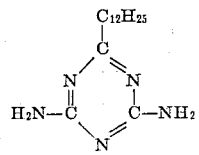

2.0 mols of urea, 1.0 mol of lauronitrile and 1.5 mols of anhydrous ammonia are placed in a 300 cc. autoclave and heated at 350° C. for 2 hours. The autoclave is thereafter quenched in cold water, cooled and vented to release the pressure. The product is discharged from the bomb and is an oily white mass. The product is subjected to steam distillation to remove unreacted lauronitrile. The residue remaining in the steam distillation flask is treated with 500 cc. of water to which 60 cc. of 37% HCl have been added, brought to a boil and filtered while hot. The filtrate is then rendered basic with 28% $NH_4OH$ to precipitate the lauroguanamine as a soft pasty solid.

What is claimed is:

1. A process for the preparation of guanamines comprising reacting a nitrile of the group consisting of hydrocarbon-aliphatic and aromatic nitriles with urea at a temperature within the range of substantially 250°–500° C.

2. A process for the preparation of guanamines comprising reacting a nitrile of the group consisting of hydrocarbon-aliphatic and aromatic nitriles with urea under an ammonia pressure of at least 200 lbs./sq. in. at a temperature within the range of substantially 250°–500° C.

3. A process for the preparation of guanamines comprising reacting a nitrile of the group consisting of hydrocarbon-aliphatic and aromatic nitriles with urea under an ammonia pressure of at least 200 lbs./sq. in. at a temperature within the range of substantially 250°–500° C., said ammonia pressure being provided by the addition of ammonia.

4. A process for the preparation of guanamines comprising reacting a nitrile of the group consisting of hydrocarbon-aliphatic and aromatic nitriles with urea under an ammonia pressure of at least 200 lbs./sq. in. at a temperature within the range of substantially 270°–390° C.

5. A process for the preparation of guanamines comprising reacting a nitrile of the group consisting of hydrocarbon-aliphatic and aromatic nitriles with urea under an ammonia pressure of at least 200 lbs./sq. in. at a temperature within the range of substantially 270°–390° C., said ammonia pressure being provided by the addition of ammonia.

6. A process for the preparation of guanamines comprising reacting a nitrile of the group consisting of hydrocarbon-aliphatic and aromatic nitriles with urea under an ammonia pressure of at least 200 lbs./sq. in. at a temperature within the range of substantially 270°–390° C., said ammonia pressure being provided by the addition of ammonia.

JOHNSTONE S. MACKAY.

REFERENCES CITED

The following references are of record in the file of this patent:

UNITED STATES PATENTS

| Number | Name | Date |
| --- | --- | --- |
| 2,121,551 | Rigby | June 21, 1938 |

OTHER REFERENCES

Chemical Abstracts, p. 2099, vol. 5 (bottom of page).

Monat fur Chemie 10, pp. 99 and 95.

Monat fur Chemie 9, p. 705.

Certificate of Correction

Patent No. 2,527,314

October 24, 1950

JOHNSTONE S. MACKAY

It is hereby certified that error appears in the printed specification of the above numbered patent requiring correction as follows:

Column 8, line 33, for "200 lbs./sq. in." read *2000 lbs./sq. in.*; and that the said Letters Patent should be read as corrected above, so that the same may conform to the record of the case in the Patent Office.

Signed and sealed this 19th day of December, A. D. 1950.

[SEAL]

THOMAS F. MURPHY,
*Assistant Commissioner of Patents.*